United States Patent [19]

Kobayashi et al.

[11] Patent Number: 4,560,633
[45] Date of Patent: Dec. 24, 1985

[54] REINFORCED HIGH POLYMERS, PROCESS FOR PREPARING SAME AND BATTERY HAVING SAME

[75] Inventors: Yukio Kobayashi; Kinya Yamaguchi, both of Tokyo; Masaaki Kira, Yokohama, all of Japan

[73] Assignees: Showa Denko Kabushiki Kaisha; Hitachi Ltd., both of Tokyo, Japan

[21] Appl. No.: 705,861

[22] Filed: Feb. 27, 1985

Related U.S. Application Data

[63] Continuation of Ser. No. 619,692, Jun. 13, 1984, abandoned, which is a continuation of Ser. No. 424,445, Sep. 27, 1982, abandoned.

[30] Foreign Application Priority Data

Sep. 25, 1981 [JP] Japan ................................ 56-150647
May 27, 1982 [JP] Japan ................................ 57-88823
May 27, 1982 [JP] Japan ................................ 57-88824

[51] Int. Cl.$^4$ .......................................... H01M 10/36
[52] U.S. Cl. .................................... 429/213; 429/234
[58] Field of Search ................................ 429/213, 234

[56] References Cited

U.S. PATENT DOCUMENTS

| | | | |
|---|---|---|---|
| 3,185,590 | 5/1965 | Mayer et al. | 429/213 |
| 3,192,071 | 6/1965 | Vinal | 429/213 |
| 3,639,174 | 2/1972 | Kegelman | 429/213 |
| 4,321,114 | 3/1982 | MacDiarmid et al. | 429/213 |
| 4,333,996 | 6/1982 | Louzos | 429/213 |
| 4,375,427 | 3/1983 | Miller et al. | 429/213 |

FOREIGN PATENT DOCUMENTS 1216549 12/1970 United Kingdom ................ 429/213

Primary Examiner—Donald L. Walton
Attorney, Agent, or Firm—McAulay, Fields, Fisher, Goldstein & Nissen

[57] ABSTRACT

A reinforced acetylene high polymer shaped article is provided, which is comprised of an acetylene high polymer and 10 to 500 wt. parts, per 100 wt. parts of the acetylene high polymer, of a sheet-form product of a fibrous material. The reinforced acetylene high polymer shaped article is prepared by polymerizing acetylene in the presence of the sheet-form product coated or impregnated with a catalyst solution, or by superposing the acetylene high polymer upon the sheet-form product and then pressing or calendering the superposed assembly. The reinforced acetylene high polymer shaped article is useful particularly as an electrode of a battery.

57 Claims, 2 Drawing Figures

REINFORCED HIGH POLYMERS, PROCESS FOR PREPARING SAME AND BATTERY HAVING SAME

This application is a continuation of Ser. No. 619,692, filed June 13, 1984, now abandoned, which in turn is a continuation of application Ser. No. 424,445, filed Sept. 27, 1982, now abandoned.

BACKGROUND OF THE INVENTION

1. Field of the Invention

This invention relates to an acetylene high polymer reinforced with a sheet-form product of a fibrous material, and to a process for preparing the reinforced acetylene high polymer. It also relates to a battery having the reinforced acetylene high polymer as at least one electrode.

2. Description of the Prior Art

It is known that a powdery acetylene high polymer prepared by polymerizing acetylene by using a so-called Ziegler-Natta catalyst comprising a transition metal compound and an organometallic compound exhibits an electrical conductivity falling within the semiconductor region and is therefore useful as an electrical and electronic element material. However, this polymer is not fused even if it is heated, and when the polymer is heated in the presence of oxygen, it readily undergoes oxidative deterioration, and cannot be molded according to conventional methods adopted for thermoplastic resins. Furthermore, a solvent capable of dissolving this acetylene high polymer has not been found. Accordingly, only the following two methods have heretofore been adopted for obtaining shaped articles of acetylene high polymers.

(A) A powdery low crystalline acetylene high polymer having no fibrous microcrystalline (fibril) structure is compression-molded by using a mold.

(B) Under specific polymerization conditions, polymerization is carried out to prepare a highly crystalline acetylene high polymer of a film form having a fibrous microcrystalline (fibril) structure (see Japances Examined Patent Publication No. 32,581/73).

Molded articles prepared by the above-mentioned method (A) have a low mechanical strength are difficult to use in many industrial fields. Molded articles prepared by the above-mentioned method (B) have a mechanical strength higher than that of the molded articles prepared by the method (A). However, the product of the method (B) does not have completely satisfactory mechanical strength.

It also is known that when this powdery low crystalline acetylene high polymer having no fibrous microcrystalline structure is treated with an electron acceptor such as $BF_3$, $BCl_3$, $HCl$, $Cl_2$, $SO_2$, $NO_2$, $HCN$, $O_2$ or $NO$, the electrical conductivity is increased by about 1,000 times, and in contrast, when this powdery acetylene polymer is treated with an electron donor such as ammonia or methylamine, the electrical conductivity is reduced to about 1/10,000 in the extreme case [D. J. Berets et al., Trans. Farady Soc., 64, 823 (1968)].

Furthermore, it is known that a highly crystalline acetylene high polymer having a lamellar structure is obtained under specific polymerization conditions [Makromol. Chem., Rapid Comm., 1, 621 (1980)]. It also is known that when a thin film of an acetylene high polymer prepared by the above-mentioned method (B) is chemically doped with an electron-accepting compound such as $I_2$, $Cl_2$, $Br_2$, $ICl$, $IBr$, $AsF_5$, $SbF_5$ or $PF_6$ or an electron donor such as Na, K or Li, the electrical conductivity of the acetylene high polymer can freely be controlled within a broad range of from $10^{-9}$ to $10^3$ $\Omega^{-1} \cdot cm^{-1}$ [J. C. S. Chem. Commu., 578 (1977), Phys. Rev. Lett., 39, 1098 (1977), J. Am. Chem. Soc., 100, 1013 (1978) and J. Chem. Phys., 69, 5098 (1978)]. It has already been proposed that this doped acetylene high polymer film, be used for the positive electrode of a primary battery [Molecular Metals, NATO Conference Series, Series VI, 471–489 (1978)].

In addition to the above-mentioned chemical doping method, there has already been developed a method in which a p-type or n-type electrically conductive acetylene high polymer is prepared by electrochemically doping an acetylene high polymer with an anion such as $ClO_4^-$, $PF_6^-$, $AsF_6^-$, $AsF_4^-$, $CF_3SO_3^-$ or $BF_4^-$ or a cation such as $R'_4N^+$ (R' stands for an alkyl group) [J.C.S. Chem. Commu., 1979, 594, C & EN Jan. 26, 39 (1981) and J.C.S. Chem. Commu., 1981, 317]. A rechargeable secondary battery comprising an acetylene high polymer film obtained by the above-mentioned method (B), which is electrochemically doped, has been reported (Paper Presented at the International Conference on Low Dimensional Synthetic Metals, Hersinger, Denmark, Aug. 10-15, 1980). This battery comprises as positive and negative electrodes two acetylene high polymer films having a thickness of, for example, 0.1 mm, which are obtained by the method (B). When this battery is immersed in a tetrahydrofuran solution containing lithium iodide and is connected to a 9-V direct current power source, the acetylene high polymer film as the positive electrode is doped with iodine and the acetylene high polymer film as the negative electrode is doped with lithium. This electrolytic doping corresponds to the charging step. If a load is connected to the two doped electrodes, the lithium ion is reacted with the iodine ion and an electric power can be taken out. In this case, the open end voltage (Voc) is 2.8 V and the short circuit current density is 5 $mA/cm^2$. When a tetrahydrofuran solution containing lithium perchlorate is used as the electrolyte, the open end voltage is 2.5 V and the short circuit current density is about 3 $mA/cm^2$.

Since the above-mentioned battery is formed by using as the electrode material an acetylene high polymer which is capable of providing a light-weight and small-size battery, this battery is of interest as a cheap battery having a high energy density, the weight and size of which can easily be reduced. Each of the acetylene high polymers used for electrodes in these batteries disclosed in the prior art references is a porous acetylene high polymer film prepared by the above-mentioned method (B), and these batteries comprising electrodes formed of such acetylene high polymers are not satisfactorily sufficient in their cycle life, discharge voltage level and charging and discharging characteristics. Moreover, the electrodes prepared according to the conventional method have poor mechanical strengths and, in repeated charging-discharging test, polyacetylene is partially isolated from the electrode or the polyacetylene film is broken. Therefore, the application to batteries comprising as the electrode material of acetylene high polymers prepared by known methods is considerably limited and the development of a light-weight, small-size cheap battery excellent in the mechanical strengths of its electrode, the energy density and the discharge voltage level is eagerly desired in the art.

Some of the inventors of the present invention have already proposed several processes for preparing an acetylene high polymer having a fibrous microcrystalline (fibril) structure and having a higher mechanical strength, which processes are different from the above-mentioned conventional method, and also several methods for molding this acetylene high polymer (Japanese Unexamined Patent Publications Nos. 128,419/80, 129,404/80, 142,030/80, 145,710/80, 145,711/80 and No. 10,428/81), and also proposed new dopants for an acetylene high polymer (Japanese Unexamined Patent Publications Nos. 129,424/80, 129,425/80, 129,426/80, 129,427/80, 143,702/80 and 143,703/80).

However, when acetylene high polymers prepared by the known methods are used for certain purposes, for example, as electrode materials (J.C.S. Chem. Commu., 1979, 594), the mechanical strengths are not always satisfactory.

SUMMARY OF THE INVENTION

It is a primary object of the present invention to provide a reinforced acetylene high polymer shaped article having enhanced mechanical strengths.

Another object of the present invention is to provide a reinforced acetylene high polymer shaped article which is useful as an electrical or electronic material, particularly as an electrode material.

Other objects and advantages will be apparent from the following description.

In accordance with the present invention, there is provided a reinforced acetylene high polymer shaped article which comprises an acetylene high polymer and a sheet-form product of a fibrous material.

DETAILED DESCRIPTION OF THE PREFERRED EMBODIMENTS

Figure 1:
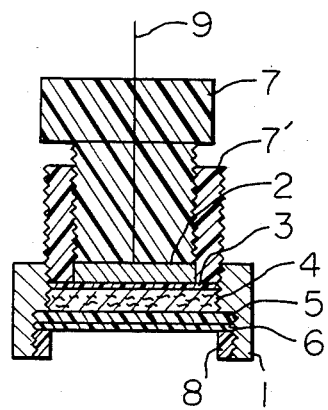
FIG. 1 is a sectional diagram illustrating an electrolytic cell for measuring the characteristics of a button type primary battery provided with a positive electrode made of the reinforced acetylene high polymer of the present invention.

As the fibrous material used in the present invention, there can be mentioned, for example, staple fibers, monofilaments, multifilaments and wires, which are made of organic high polymers and inorganic materials such as carbon, metals, glass and ceramics. Furthermore, an electrically conductive fibrous material formed by incorporating a metal into a plastic material can also be used as the fibrous material in the present invention.

The sheet-form product of the fibrous material useful in the present invention includes, for example, woven or knitted fabrics, non-woven fabrics, nets or screens, which are made of the above-mentioned fibrous material. More specifically, there can be mentioned woven fabrics, non-woven fabrics and nets, which are composed of nylon fibers, polyester fibers, acrylic fibers, cotton fibers, silk fibers, metal wires, metal-plated fibers, carbon fibers, carbon-containing composite fibers, metal-vacuum-deposited fibers, metal-containing synthetic fibers and the like. Preferable sheet-form products are nets and screens having a mesh size of 10 to 400 (according to Tyler standard sieve) or a porosity of 30 to 90%, and woven or knitted fabrics, non-woven fabrics and similar products, which have a porosity of 30 to 90%. The thickness of the sheet-form product is not critical.

The reinforced acetylene high polymer shaped article of the present invention can be prepared according to the following processes.

(1) A sheet-form product of a fibrous material is coated or impregnated with a catalyst solution. Acetylene is polymerized in the presence of the catalyst-coated or -impregnated sheet-form product to deposit an acetylene high polymer on the sheet-form product during the polymerization step. It is preferable that the resulting acetylene high polymer deposited on the sheet-form product be pressed or calendered by using press-rollers or calender rollers. It is possible that acetylene be polymerized in the presence of the sheet-form product impregnated with a catalyst solution or dispersion in an organic solvent, and the resulting polyacetylene deposited on the sheet-form product be pressed or calendered in the state where the organic solvent is contained in the sheet-form product.

(2) A swollen or gel-like acetylene high polymer containing an organic solvent and a sheet-form product of a fibrous material are superposed upon another and the superposed assembly is pressed or calendered.

(3) A swollen or gel-like acetylene high polymer containing a solvent is mechanically pulverized, the resulting powdery or short fibrous acetylene high polymer is superposed on the sheet-form product of a fibrous material and the superposed assembly is subjected to pressing or calendering.

(4) A powdery or short fibrous acetylene high polymer containing an organic solvent is superposed on the fibrous material and the superposed assembly is pressed or calendered.

(5) A powdery or short fibrous acetylene high polymer free of an organic solvent is superposed on the sheet-form product of a fibrous material and the superposed assembly is pressed or calendered.

(6) An acetylene high polymer obtained by drying or freeze-drying a swollen or gel-like acetylene high polymer is mechanically pulverized and the formed powdery or short fibrous acetylene high polymer and the sheet-form product of a fibrous material are pressed or calendered.

In the case where the reinforced acetylene high polymer shaped article is prepared by pressing or calendering, said pressing or calendering may be carried out either in the presence or absence of an organic solvent. However, it is preferable that the reinforced acetylene high polymer shaped article is prepared in the presence of an organic solvent, namely, by the above-mentioned processes (1), (2), (3), and (4). This is because a reinforced acetylene high polymer shaped article having more enhanced mechanical strenghts can be prepared by using an organic solvent.

The acetylene high polymer may be either a homopolymer or a copolymer comprising up to 20 mole % of a comonomer unit. The copolymerizable monomer includes, for example, acetylene derivatives having an acetylenic unsaturated bond, such as methylacetylene, phenylacetylene, diphenylacetylene, monofluoroacetylene and perfluoroacetylene. An acetylene homopolymer is preferable for use as an electrode material.

It is preferred that the acetylene high polymer to be integrated with the sheet-form product of the fibrous material be a linear polymer of the conjugated chain type. Any of powdery, fibrous, filmy and swollen (gel-like) polymers can be used, but a highly crystalline polymer having a fibrous microcrystalline (fibril) structure or a lamellar structure is preferred. Highly crystalline acetylene high polymers having a fibrous microcrystalline (fibril) structure or a lamellar structure can be prepared according to methods disclosed in, for example, Makromol. Chem., Rapid Comm., 1, 621 (1980), J. Chem. Phys., 69 (1), 106 (1978), Japanese Unexamined Patent Publications Nos. 128,419/80, 129,404/80, 142,030/80, 145,710/80, 145,711/80 and 10,428/81 and Japanese Patent application No. 34,687/80.

The "swollen or gel-like acetylene high polymer" used herein means an acetylene high polymer having a fibrous microcrystalline (fibril) structure, which is in the state of being entangled with each other in an organic solvent and thus is swollen with the solvent. This swollen or gel-like polymer is different from a so-called "gel".

Preferable acetylene high polymers are of a powdery form, a short fibrous form, or a swollen or gel-like form. Particularly, a powdery acetylene high polymer having an average particle size smaller than 0.5 cm, especially smaller than 0.2 cm, or a short fibrous acetylene high polymer having a length of smaller than 5 cm, especially smaller than 2 cm, is more preferable. These acetylene high polymers can be prepared according to the method of Natta et al. [Atti. Acad. Nazl. Linoi Rend. Calsse Sci. Fis. Mat. Nat 25, 3 (1958)], the method of Hatano et al. [J. Polym. Sci. 51, 526 (1961)], the method of Tsuchida et al. [J. Polym. Sc. A2, 3347 (1964)], the method of Pez (U.S. Pat. No. 4,228,060) and the method proposed by some of the inventors of the present invention (Japanese Unexamined Patent Publications No. 129,404/80 and No. 145,710/80). Applicable methods are not limited to the methods mentioned above. Moreover, there is advantageously adopted a method in which a swollen acetylene high polymer film prepared according to the method proposed by some of the inventors of the present invention in Japanese Unexamined Patent Publication No. 115,305/81 is pulverized into a short fiber having a length smaller than 1 cm. In the case where a powdery acetylene high polymer is used, shaping is easier than when a filmy acetylene high polymer is used, and the quality of a shaped article is uniform and good.

The acetylene high polymer used in the present invention may be either amorphous or crystalline, and have an optional cis-trans composition. A crystalline acetylene high polymer having a crystalline degree of at least 60% is preferable.

It is preferable that the acetylene high polymer combined with the sheet-form product of a fibrous material be subjected to press molding or calender molding. This molding may be carried out in the presence or absence of an organic solvent. However, it is preferred that the molding be carried out in the presence of an organic solvent, because a reinforced acetylene high polymer having a higher mechanical strength is obtained.

Any of organic solvents unreactive with the acetylene high polymer can be used without any limitation. Ordinarily, aliphatic hydrocarbons, aromatic hydrocarbons, halogenated hydrocarbons, ethers, esters, lactones and alcohols are used. An organic solvent used for polymerization or removal of the catalyst can be used.

The temperature, at which the press or calender molding is carried out, is not particularly critical, but it is preferred that the molding temperature be not higher than 200° C. In the case where the molding is carried out at a temperature in the range of from room temperature to 200° C., it is preferred that the acetylene high polymer be not contacted with oxygen. The press molding or calender molding pressure is not particularly critical, but it is preferred that the molding pressure be at least 10 kg/cm$^2$, especially at least 100 kg/cm$^2$. The calender molding can be accomplished, for example, by supplying the sheet-form product of a fibrous material and an acetylene high polymer to calender rolls and passing them between pressing rolls.

The amount of the sheet-form product of a fibrous material is in the range of from 10 to 500 parts by weight, preferably 15 to 300 parts by weight and more preferably 20 to 300 parts by weight, per 100 parts by weight of the acetylene high polymer.

When an organic solvent is used, it is preferable that the amount of the organic solvent be in the range of from 10 to 500 parts by weight, more preferably from 20 to 300 parts by weight, per 100 parts by weight of the acetylene high polymer.

The reinforced acetylene high polymer shaped article, prepared by the above-mentioned processes, is excellent in uniformity and mechanical strengths. Furthermore, according to the above-mentioned processes, the shaped article of a large area can easily be prepared.

The reinforced acetylene high polymer shaped article of the present invention is useful as an electrical or electronic material, particularly, as an electrode material.

A battery having as at least one electrode formed to the reinforced acetylene high polymer shaped article of the present invention has improved strengths and battery capacities over those having a electrode made of the conventional high polymer, and in case of a primary battery, the following advantages can be attained.
(1) The discharge capacity is increased.
(2) The voltage levelness is improved.
(3) The self-discharge is reduced.

In case of a secondary battery, the following advantages can be attained.
(1) The energy density is increased.
(2) The voltage levelness is improved.
(3) The self-discharge is reduced.
(4) The cycle life is prolonged.

At least one electrode of such a battery is made from the acetylene high polymer reinforced with the sheet-form product of a fibrous material. It is preferable that the sheet-form product be electrically conductive.

The electrically conductive fibrous material used has an electrical conductivity of at least $10^{-3}\Omega^{-1}\cdot cm^{-1}$, preferably at least $10^{-2}\Omega^{-1}\cdot cm^{-1}$, especially preferably at at least $1\Omega^{-1}\cdot cm^{-1}$, at room temperature. If the electrical conductivity is lower than $10^{-3}\Omega^{-1}\cdot cm^{-1}$, the battery has poor capacity. As the electrically conductive sheet-form product of the fibrous material, there can be mentioned metal nets and other nets, woven or knitted fabrics and non-woven fabrics, which are composed of metal-plated fibers, carbon fibers, composite carbon fibers, metal-vacuum-deposited fibers and metal-containing synthetic fibers, though applicable materials are not limited to those exemplified above. A light-weight, highly electrically conductive fibrous material is preferred. An electrically conductive fibrous material formed by incorporating a metal into a plastic material is especially preferred. It is preferable that the sheet-form product of the electrically conductive fibrous material has a mesh size of 10 to 400 (according to the Tyler standard sieve) or a porosity of 30 to 90%.

Electrically conductive materials which are well known may be used in combination with the sheet-form product of a fibrous material of the present invention for use in a battery. Such electrically conductive materials include, for example, acetylene black, carbon black and graphite. When such electrically conductive materials are used, the sheet-form product may not always be electrically conductive, but may be semiconductor or an insulating material. It is preferable that the electrically conductive materials are in the form of a powder and used in an amount of 1 to 5 parts by weight per 100 parts by weight of the acetylene high polymer. When the amount of the electrically conductive material is less than 1 parts by weight, the intended effect cannot be achieved. When this amount exceeds 5 parts by weight, the energy density of the battery is reduced.

It is preferable that the electrically conductive material is uniformly mixed with the acetylene high polymer by a known procedure using a conventional mixer such as a ball mill. This mixing may be carried out either in a dry state or in a wet state, i.e., in the presence of an organic solvent. The mixing in a wet state is preferable because of the better battery properties. The amount of the organic solvent used in the wet state mixing is in the range of 1 to 10,000 parts by weight, preferably 10 to 1,000 parts by weight and more preferably 100 to 1,000 parts by weight, per 100 parts by weight of the acetylene high polymer. The type of the organic solvent is not particularly limited provided that the organic solvent is not reactive with the acetylene high polymer.

The acetylene high polymer used in the present invention is a semiconductor having an electrical conductivity in the range of from $10^{-9}$ to $10^{-5} \Omega^{-1} \cdot cm^{-1}$. If a product having a higher electrical conductivity is required, the acetylene high polymer is chemically or electrochemically doped.

As the dopant used for chemically doping the acetylene high polymer, there can be used various known electron-accepting and electron-donating compounds, for example, (1) halogens, such as iodine, bromine and bromine iodide; (2) metal halides, such as arsenic pentafluoride, antimony pentafluoride, silicon tetrafluoride, phosphorus pentachloride, phosphorus pentafluoride, aluminum chloride, aluminum bromide and aluminum fluoride, (3) protonic acids, such as sulfuric acid, nitric acid, fluorosulfuric acid, trifluoro-methane-sulfuric acid and chlorosulfuric acid; (4) oxidants, such as sulfur trioxide, nitrogen dioxide and difluorosulfonyl peroxide; (5) $AgClO^4$, and (6) tetracyanoethylene, tetracyanoquinodimethane, chloranil, 2,3-dichloro-5,6-dicyanoparabenzoquinone and 2,3-dibromo-5,6-dicyanoparabenzoquinone.

As the dopant used for electrochemically doping the acetylene high polymer, there can be used (1) anion dopants, for example, anions of halides of elements of the group Va such as $PF_6^-$, $SbF_6^-$, $AsF_6^-$ and $SbCl_6^-$, anions of halides of elements of the group IIIa such as $BF_4^-$, halogen anions such as $I^-$, $(I_3^-)$ $Br^-$ and $Cl^-$, and perchloric acid anions such as $ClO_4^-$ (each of these anions is effective as a dopant for providing a p-type electroconductive acetylene high polymer shaped article), and (2) cation dopants, for example, alkali metal ions such as $Li^+$, $Na^+$ and $K^+$, and quaternary ammonium ions such as $R_4N^+$ (R stands for a hydrocarbon group having 1 to 20 carbon atoms) (each of these cations is effective as a dopant for providing an n-type electroconductive acetylene high polymer shaped article).

Specific examples of the anion and cation dopants include $LiPF_6$, $LiSbF_6$, $LiAsF_6$, $LiClO_4$, $NaI$, $NaPF_6$, $NaSbF_6$, $NaClO_4$, $KI$, $KPF_6$, $KSbF_6$, $KClO_4$, $[(n-Bu)_4N]^+(AsF_6)^-$, $[(n-Bu)_4N]^+(PF_6)^-$, $[(n-Bu)_4N]^+ClO_4^-$, $[(n-Bu)_4N]^+ \cdot BF_4^-$, $(Et_4N)^+ \cdot BF_4^-$, $LiAlCl_4$ and $LiBF_4$. These dopants may be used singly or in combination.

As the anion dopant other than those mentioned above, there can be mentioned an $HF_2^-$ anion, and as the cation dopant other than those mentioned above, there can be mentioned pyrylium and pyridinium cations represented by the following formula (I):

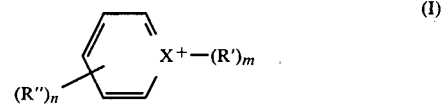

wherein X is an oxygen atom or nitrogen atom, R' is a hydrogen atom, an alkyl group having 1 to 15 carbon atoms or an aryl group having 6 to 15 carbon atoms, R" is a halogen atom, an alkyl group having 1 to 10 carbon atoms or an aryl group having 6 to 15 carbon atoms, m is 0 when X is an oxygen atom or m is 1 when X is a nitrogen atom, and n is 0 or a number of from 1 to 5, and carbonium cations represented by the following formula (II) or (III):

or

wherein $R^1$, $R^2$ and $R^3$ are a hydrogen atom (the case where all of $R^1$, $R^2$ and $R^3$ are hydrogen atoms is excluded), an alkyl group having 1 to 15 carbon atoms, an allyl group, an aryl group having 6 to 15 carbon atoms or a group $-OR^5$ in which $R^5$ is an alkyl group having 1 to 10 carbon atoms or an aryl group having 6 to 15 carbon atoms, and $R^4$ is a hydrogen atom, an alkyl group having 1 to 15 carbon atoms or an aryl group having 6 to 15 carbon atoms.

The $HF_2^-$ anion is ordinarily obtained by using as a supporting electrolyte a compound (hydrofluoride) represented sented by the following formula (IV), (V) or (VI) and dissolving it in an appropriate solvent:

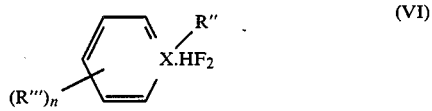

wherein R' and R" are a hydrogen atom, an alkyl group having 1 to 15 carbon atoms or an aryl group having 6 to 15 carbon atoms, R''' is an alkyl group having 1 to 10 carbon atoms or an aryl group having 6 to 15 carbon atoms, X is an oxygen atom or nitrogen atom, n is 0 or a positive integer of up to 5, and M stands for an alkali metal.

As the compound represented by the formula (IV), (V) or (VI), there can be mentioned $H_4N.HF_2$, (n-Bu)$_4$N.HF$_2$, Na.HF$^2$, K.HF$^2$, LiHF$^2$ and

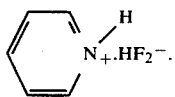

The pyrylium or pyridinium cation represented by the formula (I) is obtained by using as a supporting electrolyte a salt of the cation represented by the formula (I) with an anion such as $ClO_4^-$, $BF_4^-$, $AlCl_4^-$, $FeCl_4^-$, $SnCl_5^-$, $PF_6^-$, $PCl_6^-$, $SbF_6^-$, $AsF_6^-$, $CF_3SO_3^-$ or $HF_2^-$ and dissolving it into an appropriate organic solvent. As specific examples of the supporting electrolyte, the following compounds can be mentioned:

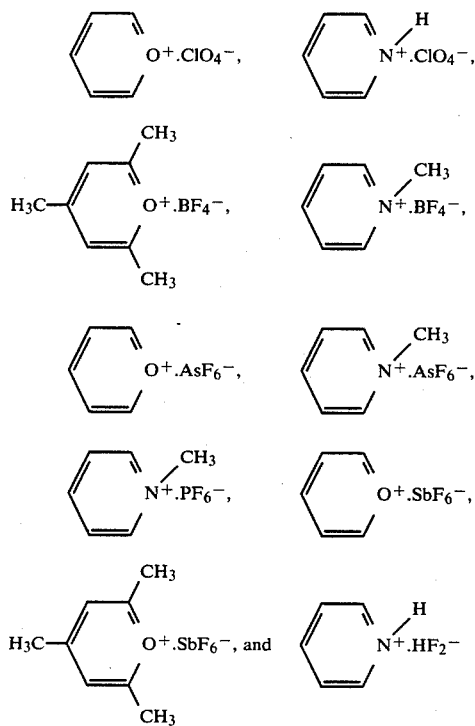

As specific examples of the carbonium cation represented by the formula (II) or (III), there can be mentioned $(C_6H_3)_3C^+$, $(CH_3)_3C^+$,

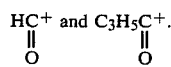

These carbonium cations are obtained by using a salt (carbonium salt) of the carbonium cation with an anion and dissolving it in an appropriate solvent. As typical instances of the anion to be used, there can be mentioned $BF_4^-$, $AlCl_4^-$, $AlBr_3Cl^-$, $FeCl_4^-$, $SnCl_3^-$, $PF_6^-$, $PCl_6^-$, $SbCl_6^-$, $SbF_6^-$, $ClO_4^-$ and $CF_3SO_2^-$. As specific examples of the carbonium salts, there can be mentioned $(C_6H_5)_3C.BF_4$, $(CH_3)_3C.BF_4$, HCO.AlC$_4$, HCO.BF$_4$ and $C_6H_3CO.SnCl_3$.

The amount of the dopant used is 2 to 40 mole %, preferably 4 to 30 mole %, more preferably 5 to 20 mole %, based on the recurring units CH in the acetylene high polymer. If the amount of the dopant doped in the acetylene high polymer is smaller than 2 mole % or larger than 40 mole %, a battery having a sufficiently large discharge capacitance cannot be obtained.

The electrical conductivity of the acetylene high polymer before doping is about $10^{-8}$ to about $10^{-9}$ $\Omega^{-1} \cdot cm^{-1}$ in case of the cis-form and about $10^{-9}$ $\Omega^{-1} \cdot cm^{-1}$ in case of the trans-form, but the electrical conductivity of the electroconductive acetylene high polymer obtained by doping of the dopant is in the range of from about $10^{-9}$ to $10^4$ $\Omega^{-1} \cdot cm^{-1}$. When the electroconductive acetylene high polymer obtained by doping of the dopant is used for an electrode of a primary battery, it is preferred that the electrical conductivity be higher than about $10^{-4}$ $\Omega^{-1} \cdot cm^{-1}$, and, when the electroconductive acetylene high polymer is used for an electrode of a secondary electrode, the electrical conductivity may be in the range of from about $10^{-9}$ to about $10^{-4}$ $\Omega^{-1} \cdot cm^{-1}$ or higher than about $10^{-4}$ $\Omega^{-1} \cdot cm^{-1}$.

The doping amount can freely be controlled by measuring the quantity of electricity flowing during the electrolysis. Doping may be carried out under a constant current or constant voltage condition or under current- and voltage-varying conditions. The doping current and voltage and the doping time vary depending upon the bulk density and area of the acetylene high polymer, the particular dopant, the particular electrolyte and the anisotropy of the electrical conductivity of the intended electroconductive acetylene high polymer.

An aqueous solution or a non-aqueous solution may be used as the solvent of the electrolyte in the present invention, but a solution of a dopant as mentioned above in a non-aqueous organic solvent is preferred as the solvent of the electrolyte. A non-protonic organic solvent having a high dielectric constant is preferred. For example, there may be used ethers, ketones, nitriles, amines, amides, sulfur compounds, chlorinated hydrocarbons, esters, carbonates and nitro compounds. Of these, ethers, ketones, nitriles, chlorinated hydrocarbons and carbonates are preferred. As typical instances, there can be mentioned tetrahydrofuran, 2-methyltetrahydrofuran, 1,4-dioxane, monogrime, acetonitrile, propionitrile, 4-methyl-2-pentanone, butyronitrile, 1,2-dichloroethane, γ-butyrolactone, dimethoxyethane, methyl formate, propylene carbonate, ethylene carbonate, dimethyl formamide, dimethyl sulfoxide, dimethyl thioformamide and sulfolane. These solvents may be used singly or in combination.

When the shaped article of the present invention is used as an electrode of a battery, as the supporting electrolyte and solvent of an electrolyte of a battery, there may be used those mentioned hereinbefore with respect to electrochemical doping, and doping may be carried out under conditions as described hereinbefore.

In the battery of the present invention, instead of the above-mentioned electrolytes, there can be used a highly ionic conductive organic solid electrolyte comprising polyethylene oxide and NaI or NaSCN or a paste of a mixture of a supporting electrolyte (dopant) and an organic solvent.

The concentration of the electrolyte used in the battery of the present invention varies depending upon the particular the positive or negative electrode, the charging and discharging conditions, the operation temperature, the particular supporting electrolyte and the particular organic solvent. However, the concentration of the supporting electrolyte is ordinarily in the range of from 0.001 to 10 moles/l.

The composite of the acetylene high polymer or an electrically conductive acetylene high polymer prepared by doping the acetylene high polymer with a dopant, with the sheet-form product of a fibrous material as well as an optional electroconductive material can be used as the active material of (1) a positive electrode, (2) a negative electrode or (3) both positive and negative electrodes in a secondary battery.

The battery (1) wherein the reinforced acetylene high polymer shaped article is used as a positive electrode includes (a) that of the type wherein the negative electrode active material ion is subject to undoping from the shaped article positive electrode during discharge and (b) that of the type wherein the negative electrode active material ion is subject to doping into the shaped article positive electrode during discharge.

The negative electrode active material used in the battery of the above-mentioned type (a) includes metals having a Pauling electronegativity value not exceeding 1.6, for example, alkali metals, such as lithium and sodium, aluminum and magnesium. Of these, lithium and sodium are preferable. These metals may be used in the form of a sheet, as in the case of an ordinary lithium battery, or such a sheet may be compression-bonded to a wire net of nickel or stainless steel.

As examples of the secondary battery of the above-mentioned structure (1) wherein the reinforced acetylene high polymer is used as a positive electrode active material, there can be mentioned $(CH)_x$ (positive)/$LiClO_4$ (electrolyte)Li (negative) and $[(CH)^{+0.06}(ClO_4)^{-0.06}]_x$ (positive)/$LiClO_4$ (electrolyte)/Li (negative). Examples of the secondary battery of the above-mentioned structure (3) wherein the reinforced acetylene high polymer is used as both positive and negative electrode active materials, there can be mentioned $[(CH)^{+0.024}(ClO_4)^{-0.024}]_x$ (positive)/$(n-Bu_4N)^+.(ClO_4)^-$ (electrolyte)/$[(n-Bu_4N)^{+0.024}(CH)^{-0.024}]_x$ (negative), $[(CH^{+0.06}(PF_6)^{-0.06}]_x$ (positive)/$(n-Bu_4N)^+.(PF_6)^-$ (electrolyte)/$[(n-Bu_4N)^{+0.06}(CH)^{-0.06}]$(negative), $[(CH)^{+0.050}(ClO_4)^{-0.050}]_x$ (positive)/$(n-Bu_4N)^+.(ClO_4)^-$ (supporting electrolyte)/$[(CH)^{+0.020}(ClO_4)^{-0.020}]_x$ (negative), $[(n-Bu_4N)^{+0.02}(CH)^{-0.02}]_x$ (positive)/$(n-Bu_4N)^+.(ClO_4)^-$ (supporting electrolyte)/$[(n-Bu_4N)^{+0.07}(CH)^{-0.07}]_x$ (negative) and $[(CH)^{+0.010}(I_3)^{-0.010}]$ (positive)/NaI (solid electrolyte)/$[(CH)^{-0.010}(Na)^{+0.010}]_x$ (negative). Incidentally, $(CH)_x$ designates the acetylene high polymer shaped article.

It is possible that the reinforced acetylene high polymer shaped article of the present invention is used as one of the positive and negative electrodes in a secondary battery, and a conventional electroconductive high polymer such as poly-(para-phenylene), poly-(2,5-thienylene) or polypyrrole.

Among the above-mentioned secondary batteries, those of the type (1)-(a) wherein another electroconductive high polymer is used as the negative electrode active material, those of the type (1)-(b) and those of the type (3) are preferable. More preferable are those of the type (1)-(a) wherein polyparaphenylene is used as the negative electrode active material and those of the type (3).

As a typical example of a primary battery, there can be mentioned a battery wherein the positive electrode active material is made of a composite of an electroconductive acetylene high polymer, an electrically conductive material and the sheet-form product of a fibrous material, and the negative electrode active material is made of a metal having a Pauling electronegativity value not exceeding 1.6. As the metal used as the negative electrode active substance of the anode, there can be mentioned alkali metals such as lithium and sodium, and aluminum and magnesium. Lithium and aluminum or alloys of these metals are preferred. The metal may be used in the form of a sheet as in an ordinary lithium battery, or this sheet may be press-bonded to a nickel or stainless steel net.

The charge-discharge cycle life can be prolonged by the use of the reinforced acetylene high polymer shaped article of the present invention. This is prominent particularly when the reinforced acetylene high polymer shaped article is used as an electrode active material in a secondary battery.

In the present invention, if necessary, a separator composed of a porous membrane of glass or a synthetic resin such as polyethylene or polypropylene or a natural fiber paper may be used.

The acetylene high polymer used in the present invention is gradually oxidized by oxygen and the capacities of the battery are reduced. Accordingly, it is necessary that the battery should be closed to produce a substantially oxygen-free state.

A battery comprising the shaped article of the present invention as an electrode has a high energy density, a long cycle life, a good voltage levelness and a high charging and discharging efficiency. Furthermore, since the battery of the present invention has a light weight and a small size and the energy density is high, the battery is suitable for a portable appliance, an electric automobile or a gasoline car or as a power storage battery.

The present invention will now be described in detail with reference to the following Examples that by no means limit the scope of the invention.

EXAMPLE 1

[Preparation of Acetylene High Polymer and Composite Article Thereof]

A glass reaction vessel having an inner capacity of 500 ml was charged with 5.1 ml (15.0 millimoles) of titanium tetrabutoxide in a nitrogen atmosphere, and the titanium tetrabutoxide was dissolved in 20.0 ml of toluene and the reaction vessel was cooled to $-78°$ C. Then, 5.4 ml (40 millimoles) of triethyl aluminum was added to the content of the reaction vessel with stirring to form a catalyst solution. The catalyst solution was aged at room temperature for 1 hour and used for the polymerization of the next step.

A glass reaction vessel having an inner capacity of 500 ml, the inner atmosphere of which was substituted by nitrogen, was charged with a woven fabric of an electroconductive fiber (a blend of an acrylic fiber and a fine copper wire having an electrical conductivity of $1.7 \times 10^{-3} \Omega^{-1} \cdot cm^{-1}$ and marketed under the tradename of "Sanderlon SS-N" by Nippon Sanmoh Senshoku K.K.), and the reaction vessel was cooled to −78° C. and both the surfaces of the woven fabric were uniformly coated with the above-mentioned catalyst solution. Then, the nitrogen gas in the reaction vessel was removed by a vacuum pump and, then, purified acetylene gas was introduced under a pressure of 1 atmosphere into the reaction vessel to initiate the polymerization. Simultaneously with initiation of the polymerization, an acetylene high polymer was precipitated on both the coated surfaces of the woven fabric. The polymerization reaction was carried out at −78° C. for 15 minutes while maintaining the acetylene pressure at 1 atmosphere, and the unreacted acetylene gas was removed by a vacuum pump to stop the polymerization. In the nitrogen gas atmosphere, the residual catalyst solution was removed by means of an injector and washing with 100 ml of refined toluene was repeated 6 times while maintaining the temperature at −78° C., and the woven fabric was vacuum-dried at room temperature. The acetylene high polymer was uniformly deposited on both the surfaces of the woven fabric. The obtained reinforced acetylene high polymer contained 25% by weight of the electroconductive fiber and had a film thickness of 250 μm and a tensile strength of higher than 2,000 kg/cm². The cis-content of this acetylene high polymer was 89% and the acetylene high polymer was a p-type semiconductor having an electrical conductivity of $2.9 \times 10^{-8} \Omega^{-1} \cdot cm^{-1}$ (as determined by the direct current two-terminal method).

COMPARATIVE EXAMPLE 1

The polymerization of acetylene was carried out in the same manner as described in Example 1 except that the woven fabric of the electroconductive fiber was not used, whereby an acetylene high polymer film having a thickness of 96 μm and a cis-content of 92% was obtained. The tensile strength of this acetylene high polymer was 420 kg/cm².

EXAMPLE 2

[Preparation of Acetylene High Polymer and Composite Article Thereof]

The polymerization of acetylene was carried out in the same manner as described in Example 1 except that a 100-mesh (the ASTM standard) nylon net was used instead of the woven fabric of the electroconductive fiber used in Example 1, whereby a reinforced acetylene high polymer film containing 13% of the nylon net and having a thickness of 270 μm was obtained. The tensile strength of this reinforced acetylene high polymer film was higher than 2,000 kg/cm².

EXAMPLE 3

[Preparation of Acetylene High Polymer and Composite Article Thereof]

An one liter capacity glass autoclave equipped with a vane-type mechanical stirrer was charged with 200 ml of toluene, 2 ml (5.9 millimoles) of tetrabutoxy titanium and 2 ml (14.6 millimoles) of triethyl aluminum in a nitrogen atmosphere, and polymerization of acetylene was carried out at a polymerization temperature of −20° C. under an acetylene partial pressure of 0.9 kg/cm² with stirring for 2 hours. Simultaneously with initiation of the introduction of acetylene gas, formation of a reddish violet acetylene high polymer in the form of a short fiber having a length of about 1 mm was started. After completion of the polymerization, the formed short fibrous acetylene high polymer was placed on a glass filter and washed sufficiently with about 1 l of toluene to remove the catalyst. As the catalyst was removed, the short fibrous acetylene high polymer contained 52% by weight of toluene. Then, 2 g of the toluene-containing short fibrous acetylene high polymer was placed on a 100-mesh stainless steel net (the electrical conductivity was $1 \times 10^3 \Omega^{-1} \cdot cm^{-1}$ or higher) having an area of 100 cm² and pressed at room temperature under a pressure of 1,000 kg/cm² and then deaerated in vacuo, to obtain a composite sheet of the acetylene high polymer and the stainless steel net having a thickness of 150 μm, having a structure such that the stainless steel net was interposed between the layers of the acetylene high polymer. The surface of the composite sheet had a metallic gloss, and the tensile strength of the composite sheet was higher than 2,000 kg/cm².

The yield of the short fibrous acetylene high polymer obtained according to the above-mentioned polymerization process was 5.7 g, and the high polymer had a cis-content of 76% and an electrical conductivity of $5.1 \times 10^{-6} \Omega^{-1} \cdot cm^{-1}$ at room temperature (as determined by the direct current two-terminal method). When the obtained short fibrous acetylene high polymer was examined by a scanning type electron microscope, it was found that the acetylene high polymer had a structure composed of fibrous microcrystals (fibrils) having a diameter of 300 to 400 Å.

[Production and Test of Battery]

A test piece having a width of 0.5 cm and a length of 2.0 cm was cut out from the so-obtained composite sheet of the short fibrous acetylene high polymer and the stainless steel net, and the test piece was mechanically press-bonded to a platinum wire to form a positive electrode. Metallic lithium was used as an negative electrode and metallic lithium was used also as a reference electrode, and charging (the quantity of electricity corresponded to the doping amount of 9 mole %) was carried out for 1.2 hours under a constant current (0.5 mA/cm²) by using a propylene carbonate solution containing 1.0 mole/l of LiClO₄ as an electrolyte solution. Immediately after termination of the charging, discharging was carried out under a constant current (0.5 mA/cm²), and when the voltage was reduced to 2.5 V, the charging was carried out again under the same conditions as described above. This charging-discharging cycle was repeated 620 times. The voltage characteristics at the 620th discharging were the same as those at the first discharging.

From the results of the charging-discharging test of the first cycle, it was found that the energy density was 740 w·hr/kg of the acetylene high polymer in the composite sheet used, and the charging-discharging coulombic efficiency was 97%. The ratio of the quantity of electricity discharged until the voltage was reduced to 3 V at the discharging step, to the total quantity of the electricity discharged, was 91%.

COMPARATIVE EXAMPLE 2

The pressing operation for the preparation of a polymer film was carried out in the same manner as described in Example 3 except that the 100-mesh stainless steel net used in Example 3 was not used. The polymer was scattered and a film was not obtained.

COMPARATIVE EXAMPLE 3

[Preparation of Acetylene High Polymer Article]

A molded article of an acetylene high polymer was prepared in the same manner as in Example 3 except that the pressing operation was carried out by using the same mold as that used in Example 5 given hereinafter instead of the stainless steel net used in Example 3.

The tensile strength of the molded article was 620 kg/cm$^2$ and the bulk density of the molded article was 0.41 g/cc.

[Production and Test of Battery]

The repeated charging-discharging test was carried out in the same manner as described in Example 3 except that the so-obtained molded article of the acetylene high polymer was used and the charging time was changed to 1 hour (the quantity of electricity corresponded to the doping amount of 9 mole %). When the charging-discharging test was repeated 205 times, charging became impossible. When the molded article of the acetylene high polymer was taken out and examined, it was found that the molded article was broken, and, when a part of the broken molded article was analyzed by the elementary analysis method and infrared spectrophotometric analysis method, it was found that the acetylene high polymer had undergone oxidative deterioration.

From the results of the charging-discharging test of the first cycle, it was found that the energy density was 570 w·hr/kg of the acetylene high polymer and the charging and discharging coulombic efficiency was 74%. The ratio of the quantity of electricity discharged until the voltage was reduced to 3 V at the discharging step, to the total quantity of the electricity discharged was 66%.

EXAMPLE 4

[Preparation of Acetylene High Polymer and Composite Article thereof]

An one liter capacity glass autoclave equipped with a vane-type mechanical stirrer, as used in Example 3, was charged with 500 ml of toluene, 0.2 ml (0.59 millimole) of tetrabutoxy titanium and 2 ml (14.6 millimoles) of triethyl aluminum, and polymerization was carried out with stirring under an acetylene partial pressure of 1.6 kg/cm$^2$ at a polymerization temperature of 30° C. Simultaneously with initiation of the introduction acetylene gas, formation of a black powdery acetylene high polymer having a particle size of 0.1 mm was started. After completion of the polymerization, the formed powdery acetylene high polymer was placed on a glass filter, and the catalyst was removed by using about 1 l of tolunene. As the catalyst was removed, the powdery acetylene high polymer contained 47% by weight of toluene. Then, 2 g of this toluene-containing powdery acetylene high polymer was placed on a 100-mesh nickel net (the electrical conductivity was higher than $1 \times 10^3 \Omega^{-1} \cdot cm^{-1}$) and pressed under a pressure of 2 ton/cm$^2$ at room temperature to obtain a composite article having a thickness of 180 μm, in which the nickel net was interposed between the acetylene high polymer layers. The surface of the composite article had a metallic gloss. The tensile strength of the composite was higher than 2,000 kg/cm$^2$.

[Production and Test of Battery]

Two test pieces having a width of 0.5 cm and a length of 2.0 cm were cut out from the so-obtained composite article of the acetylene high polymer and the nickel net, and the test pieces were mechanically press-bonded to different platinum wires to form a positive electrode and a negative electrode. Charging (the quantity of electricity corresponded to the doping quantity of 9 mole %) was carried out for 2 hours under a constant current (0.5 mA/cm$^2$) by using a tetrahydrofurn solution containing 0.5 mole/l of $(Bu_4N)^+(PF_6)^-$ as an electrolyte solution. Immediately after termination of the charging, discharging was carried out under a constant current (0.5 mA/cm$^2$), and when the voltage was reduced to 1 V, the charging was carried out again under the same conditions as described above. This charging-discharging cycle was repeated 730 times. The voltage characteristics at the 730th discharging were the same as those at the first discharging.

It was found that the energy density was 290 w·hr/kg of the acetylene high polymer in the composite article used, and the charging-discharging coulombic efficiency was 86%. The ratio of the quantity of electricity discharged until the voltage was reduced to 1.5 V at the discharging step, to the total quantity of the electric charge discharged was 90%.

COMPARATIVE EXAMPLE 4

The pressing operation for the preparation of a composite article was carried out in the same manner as described in Example 4 except that the 100-mesh nickel net used in Example 4 was not used. The polymer was scattered and a composite article could not be obtained.

COMPARATIVE EXAMPLE 5

[Preparation of Composite Article of Acetylene High Polymer]

The powdery acetylene high polymer obtained in Example 4 was packed in a mold having a thickness of 10 mm, a length of 100 mm and a width of 50 mm and inserted between chromium-plated ferro sheets, and press molding was carried out at room temperature under a pressure of 1,000 kg/cm$^2$ while removing toluene, to obtain a composite article having a thickness of 5 mm. This composite article was brittle and the tensile strength was 140 kg/cm$^2$.

[Production and Test of Battery]

A battery was constructed by using the composite article as the electrodes, and the charging-discharging test was carried out, in the same manner as in Example 4. The charging-discharging test could be repeated only 211 times. It was found that the energy density was 142 w hr/kg and the coulombic efficiency was 42%.

EXAMPLE 5

[Preparation of Acetylene High Polymer and Composite Article Thereof]

An one liter capacity glass reaction vessel, the inside atmosphere of which was completely substituted by nitrogen gas, was sequentially charged at room temperature with 200 ml of toluene refined according to a customary procedure as the polymerization solvent, and 2.94 millimoles of tetrabutoxy titanium and 7.34 millimoles of triethyl aluminum as the catalyst, whereby a catalyst solution was formed. The catalyst solution was homogeneous. The reaction vessel was cooled by liquefied nitrogen, and nitrogen gas in the reaction vessel was removed by a vacuum pump.

The reaction vessel was cooled to −78° C. and refined acetylene gas was blown thereinto under a pressure of 1 atmosphere with stirring by a magnetic stirrer. In the initial stage of the polymerization, the entire reaction mixture became gelatinous and stirring became difficult. The polymerization reaction was continued for 24 hours while maintaining the acetylene pressure at 1 atmosphere. The reaction mixture had a reddish violet color and was gel-like. After completion of the polymerization, the unreacted acetylene gas was removed, and the reaction product was washed with 200 ml of refined toluene 4 times while maintaining the temperature at −78° C. Even after the washing, the solution was slightly brown and the catalyst could not completely be removed. The sheet-like gel-like acetylene high polymer swollen in toluene was composed of uniform chips of entangled fibrous microcrystals, and a powdery or bulky polymer was not formed.

A part of the uniform gel-like product was taken out and dried, and the amount of the acetylene high polymer in the gel-like product was measured. It was found that the gel-like product contained 10% by weight of the acetylene high polymer.

The gel-like product was packed in a mold having a thickness of 10 mm, a length of 100 mm and a width of 50 mm and inserted between chromium-plated ferro type plates. The gelatinous plate was press-molded together with a 150-mesh platinum net (the electrical conductivity was higher than $1 \times 10^3 \Omega^{-1} \cdot cm^{-1}$) at room temperature under a pressure of 500 kg/cm² while removing toluene, whereby a composite article having a thickness of 5 mm was obtained. The tensile strength of the composite article was higher than 2,000 kg/cm².

[Doping Experiment]

A test piece having a width of 0.5 cm and a length of 2.0 cm was cut out from the composite article prepared according to the above-mentioned method, and the test piece was mechanically press-bonded to a platinum wire to form a positive electrode. Doping was carried out under a constant current (10 mA) for 5 hours by using a platinum plate as a negative electrode and a propylene carbonate solution containing 0.5 mole/l of a Li.BF₄ as the electrolyte. After completion of the doping, the doped acetylene high polymer film was washed repeatedly with propylene carbonate to obtain a composite article comprising a doped acetylene high polymer having a golden metallic gloss. From the results of the elementary analysis, it was found that the composition of the doped acetylene high polymer film of this composite was expressed as $[CH(BF_4)_{0.15}]_x$, and the electrical conductivity was $770 \Omega^{-1} \cdot cm^{-1}$ (as determined by the direct current four-terminal method).

[Discharging Test of Battery]

A battery was constructed by using the $BF_4^-$-doped composite article as the positive electrode-active material and lithium as the negative electrode-active material.

FIG. 1 is a sectional diagram illustrating a battery cell for measuring the characteristics of a button type battery according to one embodiment of the present invention.

Reference numeral 1 represents an Ni-plated brass vessel, reference numeral 2 represents a disc-like lithium anode having a diameter of 20 mm, reference numeral 3 represents a circular porous polypropylene separator having a diameter of 26 mm, reference numeral 4 represents a circular carbon fiber felt having a diameter of 26 mm, reference numeral 5 represents a cathode, reference numeral 6 represents a Teflon sheet with pores having an average diameter of 2 μm (Fluoropore FP-200 supplied by Sumitomo Denko K.K.), reference numeral 7 represents a Teflon vessel having a circular section, reference numeral 8 represents a Teflon ring for fixing the positive electrode, and reference numeral 9 represents an Ni lead line.

The above-mentioned positive electrode-active material (the $BF_4^-$-doped electroconductive acetylene high polymer) was placed in a recess in the lower portion of the vessel 1, and the porous circular Teflon sheet 6 was piled on the cathode and clamped and fixed by the Teflon ring 8. The felt 4 was placed in a recess in the upper portion of the vessel 1 and piled on the positive electrode, and the felt 4 was impregnated with the electrolyte solution and the lithium negative electrode 2 was placed thereon through the separator 3. Then, the assembly was clamped by the vessel 7 to construct a battery. A solution containing 1 mole/l of Li.BF₄ in distilled dehydrated propylene carbonate was used as the electrolyte solution.

The open-circuit voltage of the thus constructed battery was 5.7 V.

Figure 2:
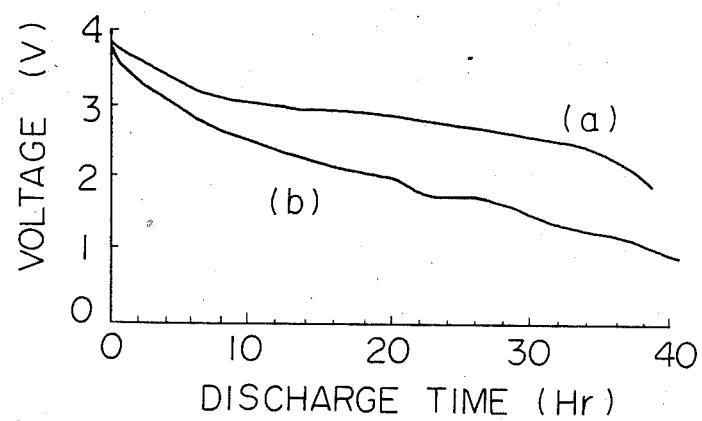
FIG. 2 shows discharge curves illustrating the relations between the discharge time and the voltage, which are observed in primary battery according to the present invention (curve a) and in primary battery of a comparative example (curve b).

This battery was subjected to the discharge test under a constant current of 0.3 mA in an argon atmosphere. The relation between the discharging time and the voltage was as indicated by curve (a) in FIG. 2.

COMPARATIVE EXAMPLE 6

A press-molded article of an acetylene high polymer was prepared in the same manner as described in Example 5 except that the platinum net used in Example 5 for the production of the composite article was not used, and the doping was carried out in the same manner as described in Example 5 by using this molded article. When the discharge test of the primary battery was carried out by using the obtained doped acetylene high polymer, the curve (b) of FIG. 2 was obtained.

EXAMPLE 6

[Preparation of Acetylene High Polymer and Composite Article Thereof]

A 300-ml capacity three-neck flask was charged with 100 ml of toluene, 2 ml of tetrabutoxy titanium and 2 ml of triethyl aluminum in a nitrogen atmosphere, and in the state where the flask was stationarily maintained at −78° C., polymerization of acetylene was carried out for 2 hours under an acetylene gas partial pressure of 1 kg/cm² to obtain 5.2 g of a sheet-like acetylene high polymer swollen with toluene. While the temperature was maintained at −78° C., 100 ml of toluene was added to wash the high polymer and the supernatant was withdrawn by means of an injector. This operation was repeated 7 times to remove the catalyst. Then, the acetylene high polymer was transferred into a 500-ml capacity separable flask equipped with a mechanical stirrer, and 300 ml of toluene was added and the stirrer was rotated at −78° C. in a nitrogen atmosphere to effect pulverization and obtain an acetylene high polymer in the form of a short fiber having a length of 1 mm. Then, 0.5 g of a small piece of this high polymer was placed on a carbon fiber woven fabric (the electrical conductivity was $21\Omega^{-1}\cdot cm^{-1}$) and pressing was carried out at room temperature under a pressure of 1 ton/cm² to obtain a flexible composite film having a metallic gloss. The tensile strength of the composite film was 1,740 kg/cm².

[Production and Test of Battery]

A battery was prepared and tested in the same manner as described in Example 3 by using the composite article obtained by the above-mentioned method. The charging-discharging test could be repeated 565 times. From the results of the charging-discharging test of the first cycle, it was found that the energy density was 720 w·hr/kg and the charging-discharging coulombic efficiency was 94%.

COMPARATIVE EXAMPLE 7

The press-molding was carried out in the same manner as described in Example 6 except that the carbon fiber woven fabric used in Example 6 was not used. The polymer was scattered and a molded article could not be obtained.

COMPARATIVE EXAMPLE 8

The press-molding of the acetylene high polymer was carried out in the same manner as described in Example 6 except that the mold used in Example 5 was used instead of the carbon fiber woven fabric used in Example 6 for production of the composite. The battery test was carried out in the same manner as described in Example 6 by using the obtained molded article. The charging-discharging test could be repeated only 225 times. The energy density was 510 w·hr/kg and the charging-discharging coulombic efficiency was 67%.

EXAMPLE 7

A glass reaction vessel having an inner capacity of 1 liter was charged with 0.2 ml (0.59 millimole) of titanium tetrabutoxide in a nitrogen atmosphere, and the titanium tetrabutoxide was dissolved in 500 ml of toluene and the reaction vessel was cooled to −78° C. Then, 2 ml (14.6 millimoles) of triethyl aluminum was added to the content of the reaction vessel with stirring to form a catalyst solution. The catalyst solution was aged at room temperature for 1 hour and used for the subsequent polymerization stage.

A glass reaction vessel having an inner capacity of 500 ml, the inner atmosphere of which was substituted by nitrogen, was charged with the same nickel net as used in Example 4, and the reaction vessel was cooled to −78° C. and both the surfaces of the net were uniformly coated with the above-mentioned catalyst solution. Then, the nitrogen gas in the reaction vessel was removed by a vacuum pump and purified acetylene gas was introduced under a pressure of 1 atmosphere into the reaction vessel to initiate the polymerization. Simultaneously with initiation of the polymerization, an acetylene high polymer was precipitated on both the coated surfaces of the 100-mesh nickel net. The polymerization reaction was carried out at −78° C. for 15 minutes while maintaining the acetylene pressure at 1 atmosphere, and the unreacted acetylene gas was removed by a vacuum pump to stop the polymerization. In the nitrogen gas atmosphere, the residual catalyst solution was removed by means of an injector and washed with 100 ml of refined toluene 6 times while maintaining the temperature at −78° C., and the net was vacuum-dried at room temperature. The acetylene high polymer was uniformly deposited on both the surfaces of the nickel net.

The so prepared composite article was calendered at room temperature by two rolls (the roll gap was 0.4 mm and the roll diameter was 3 inches) under a pressure of 500 kg/cm². The obtained reinforced acetylene high polymer contained 25% by weight of the nickel net and had a film thickness of 250 μm and a tensile strength higher than 2,000 kg/cm². The cis-content of this acetylene high polymer was 89% and the acetylene high polymer was a p-type semiconductor having an electrical conductivity of $2.9 \times 10^{-8}\Omega^{-1}\cdot cm^{-1}$ (as determined by the direct current two-terminal method).

EXAMPLE 8

Polymerization of acetylene was carried out in the same manner as described in Example 1 except that the same nickel net as used in Example 4 was used instead of the electroconductive fiber woven fabric used in Example 1, to obtain a reinforced acetylene high polymer containing 25% by weight of the nickel net and having a film thickness of 250 μm. The tensile strength of the acetylene high polymer was higher than 2,000 kg/cm². The cis-content of this acetylene high polymer was 89%, and the acetylene high polymer was a p-type semiconductor having an electric conductance of $2.9 \times 10^{-3}\Omega^{-1}\cdot cm^{-1}$.

[Battery Test]

The battery test was carried out in the same manner as described in Example 4 except that the composite article obtained by the above-mentioned method was used. The charging-discharging test could be repeated 388 times. From the results of the charging-discharging test of the first cycle, it was found that the energy density was 620 w·hr/kg and the charging-discharging coulombic efficiency was 81%.

COMPARATIVE EXAMPLE 9

An acetylene high polymer was prepared in the same manner as described in Example 8 except that the nickel net used in Example 8 for the production of the composite was not used, whereby a acetylene high polymer film having a tensile strength of 420 kg/cm² was obtained. A battery was prepared and tested in the same manner as described in Example 8 by using this acetylene high polymer film. The charging-discharging test could be repeated only 87 times. The energy density was 390 w·hr/kg and the charging-discharging coulombic efficiency was 61%.

EXAMPLE 9

An one liter capacity glass reaction vessel, the inside atmosphere of which was completely substituted by nitrogen gas, was sequentially charged at room temperature with a 100-mesh stainless steel net, 100 ml of toluene refined according to a customary procedure as the polymerization solvent, and 4.41 millimoles of tetrabutoxy titanium and 11.01 millimoles of triethyl aluminum as the catalyst, whereby a catalyst solution was formed. The catalyst solution was homogeneous. The reaction vessel was cooled by liquefied nitrogen, and nitrogen gas in the reaction vessel was removed by a vacuum pump.

The reaction vessel was cooled to −78° C. and refined acetylene gas was blown thereinto under a pressure of 1 atmosphere in the state where the catalyst solution was kept stationary. The polymerization reaction was continued for 10 hours while maintaining the acetylene pressure at 1 atmosphere. The reaction mixture had a reddish violet color and was gel-like. After completion of the polymerization, the unreacted acetylene gas was removed, and the reaction product was washed with 200 ml of refined toluene 4 times while maintaining the temperature at $-78°$ C. to obtain a swollen acetylene high polymer sheet having a thickness of about 0.5 cm and containing the stainless steel net. This acetylene high polymer swollen in toluene was composed of uniformly entangled fibrous microcrystals (fibrils) having a size of 300 to 500 Å, and a powdery or bulky polymer was not formed.

The swollen acetylene high polymer sheet containing the stainless steel net was interposed between chromium-plated ferro type plates and was preliminarily pressed at room temperature under a pressure of 100 kg/cm$^2$, and the preliminarily pressed polymer was then pressed under a pressure of 15 ton/cm$^2$ to obtain a uniform and flexible composite article having a reddish brown metallic gloss and a thickness of 230 $\mu$m. The composite article was vacuum-dried at room temperature for 5 hours. The tensile strength of the obtained composite was higher than 2,000 kg/cm$^2$, and the composite article contained 43% by weight of the stainless steel net.

[Production and Test of Battery]

A battery was prepared and tested in the same manner as described in Example 3 by using the composite article obtained by the above-mentioned method. The charging-discharging test could be repeated 803 times. From the results of the charging-discharging test of the first cycle, it was found that the energy density was 745 w·hr/kg and the charging-discharging coulombic efficiency was 97.6%.

COMPARATIVE EXAMPLE 10

An acetylene high polymer was prepared and press-molded in the same manner as described in Example 9 except that the stainless steel net used in Example 9 for the production of the composite was not used. A battery was prepared and tested in the same manner as described in Example 9 by using the so-obtained molded article. The charging-discharging test could be repeated only 233 times. The energy density was 550 w·hr/kg and the charging-discharging coulombic efficiency was 72%.

COMPARATIVE EXAMPLE 11

An acetylene high polymer composite article was prepared in the same manner as described in Example 4 except that a nickel sheet having a thickness of 200 $\mu$m was used instead of the 100 mesh nickel net.

A battery was constructed by using the composite article as the electrodes, and the charging-discharging test was carried out in the same manner as described in Example 4. The charging-discharging test could be repeated only 363 times. It was found that the energy density was 256 w·hr/kg and the coulombic efficiency was 76%.

EXAMPLE 10

[Preparation of Composite Article of Acetylene High Polymer]

20.8 g of the acetylene high polymer containing 52% by weight of toluene, obtained in Example 4, 0.5 g of a powdery carbon black having an electrical conductivity of 21$\Omega^{-1}$·cm$^{-1}$ and 20 ml of toluene were mixed together in a ball mill. The mixture was placed on a 100 mesh nickel net, and pressed together under a pressure of 300 kg/cm$^2$ at room temperature. Therefore, the pressed product was deaerated under vacuum to obtain a composite article. The composite article had a tensile strength of at least 2,000 kg/cm$^2$.

[Production and Test of Battery]

A battery was constructed by using the composite article as the electrodes, and the charging-discharging test was carried out, in the same manner as described in Example 4. The voltage characteristics at the 750th discharging were the same as those at the first discharging. It was found that the energy density was 285 w·hr/kg of the acetylene high polymer in the composite article, and the coulombic efficiency was 88%.

We claim:

1. A battery comprising a positive electrode, a negative electrode and an electrolyte, wherein at least one of said positive electrode and said negative electrode is comprised of a reinforced acetylene high polymer shaped article, which comprises (1) an acetylene high polymer or an electroconductive acetylene high polymer doped with a dopant, and (2) 10 to 500 parts by weight, per 100 parts by weight of the acetylene high polymer, of the sheet-form product of a fibrous material, and which is prepared by shaping under pressure a swollen or gel-like acetylene high polymer containing an organic solvent, together with said sheet-form product; said sheet-form product being a woven or knitted fabric, a non-woven fabric or a net or screen, which is composed of an organic high polymer fiber or an inorganic fiber, and said acetylene high polymer being prepared by polymerizing acetylene using a catalyst system comprised of a transitional metal compound and an organic metal compound, said transitional metal compound being used in an amount of 0.0001 to 0.1 mole per liter of a polymerization solvent.

2. A battery according to claim 1, wherein said net or screen has a 10 to 400 mesh size according to the Tyler standard sieve.

3. A battery according to claim 1, wherein said net or screen has a porosity of 30 to 90%.

4. A battery according to claim 1, wherein the acetylene high polymer is in the form of being pressed integrally with the sheet-form product of the fibrous material.

5. A battery according to claim 1, wherein the acetylene high polymer is of a fibril or lamellar crystalline structure.

6. A battery according to claim 5, wherein the acetylene high polymer has a crystalline degree of at least 60%.

7. A battery according to claim 1, wherein the amount of the sheet-form product of the fibrous material is in the range of from 20 to 300 parts by weight per 100 parts by weight of the acetylene high polymer.

8. A battery according to claim 1, wherein the battery is a primary battery and the acetylene high polymer is doped with said dopant, so that the electrical conductivity of the thus doped electrically conductive acetylene high polymer is at least $10^{-4}\Omega^{-1}$·cm$^{-1}$.

9. A battery according to claim 8, wherein the dopant is an anion selected from the group consisting of an anion of a halide of an element of the group VA of the Periodic Table, an anion of a halide of an element of the group IIIA of the Periodic Table, a halogen anion, a perhalo-acid anion and an organic anion.

10. A battery according to claim 8, wherein the dopant is an anion selected from the group consisting of $PF_6^-$, $SbF_6^-$, $AsF_6^-$, $SbCl_6^-$, $SiF_6^{--}$, $BF_4^-$, $BCl_4^-$, $AlCl_4^-$, $I^-$ or $I_3^-$, $Br^-$, $Cl^-$, $NO_3^-$, $POF_4^-$, $CN^-$, $ClO_4^-$, $IO_4^-$, $CF_3SO_3^-$, $CH_3CO_2^-$, $CF_3CO_2^-$, $C_6H_5SO_3^-$, $C_6H_5CO_2^-$ and $CH_3C_6H_4SO_3^-$.

11. A battery according to claim 8, wherein the dopant is a cation selected from the group consisting of an alkali metal ion and an organic cation which is selected from the group consisting of $R_{4-x}MH_x^+$ and $R_3E^+$, wherein R is alkyl or aryl, M is N, P or AS, E is O or S, and X is an integer ranging from 0 to 4.

12. A battery according to claim 8, wherein the dopant is $HF_2^-$.

13. A battery according to claim 8, wherein the dopant is a cation selected from the group consisting of pyrylium and pyridinium cations represented by the following formula (I):

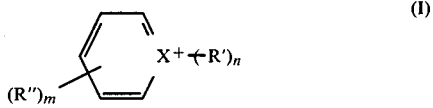

wherein X stands for an oxygen atom or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, n is zero when X is an oxygen atom or n is 1 when X is a nitrogen atom, and m is an integer of from 0 to 5; and carbonium cations represented by the following formulae (II) and (III):

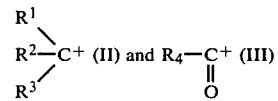

wherein $R^1$, $R^2$ and $R^3$ stand for a hydrogen atom, an alkyl group having 1 to 15 carbon atoms, an allyl group, an aryl group having 6 to 20 carbon atoms or a group $-OR^5$, in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

14. A battery according to claim 1, wherein the battery is a secondary battery and the acetylene high polymer is non-doped and has an electrical conductivity of from $1\times10^{-5}$ to $1\times10^{-9}\Omega^{-1}\cdot cm^{-1}$.

15. A battery according to claim 14, wherein both the positive and negative electrodes are made of the reinforced acetylene high polymer shaped article.

16. A battery according to claim 14, wherein the positive electrode is made of the reinforced acetylene high polymer shaped article and the negative electrode is made of another electrically conductive high polymer.

17. A battery according to claim 16, wherein the electrically conductive high polymer is polypyrrole, polythiophene or polyparaphenylene.

18. A battery according to claim 16, wherein the electrically conductive high polymer is polyparaphenylene.

19. A battery according to claim 16, wherein the electrically conductive high polymer is polypyrrole, polythiophene or polyparaphenylene.

20. A battery according to claim 16, wherein the electrically conductive high polymer is polyparaphenylene.

21. A battery according to claim 1, wherein the battery is a secondary battery and the acetylene high polymer is doped with said dopant, so that the electrical conductivity of the thus doped electrically conductive acetylene high polymer is at least $1\times10^{-9}\Omega^{-1}\cdot cm^{-1}$.

22. A battery according to claim 21, wherein the dopant is an anion selected from the group consisting of an anion of a halide of an element of the group VA of the Periodic Table, an anion of a halide of an element of the group IIIA of the Periodic Table, a halogen anion, a perhalo-acid anion and an organic anion.

23. A battery according to claim 21, wherein the dopant is an anion selected from the group consisting of $PF_6^-$, $SbF_6^-$, $AsF_6^-$, $SbCl_6^-$, $SiF_6^{--}$, $BF_4^-$, $BCl_4^-$, $AlCl_4^-$, $I^-$ or $I_3^-$, $Br^-$, $Cl^-$, $NO_3^-$, $POF_4^-$, $CN^-$, $ClO_4^-$, $IO_4^-$, $CF_3SO_3^-$, $CH_3CO_2^-$, $CF_3CO_2^-$, $C_6H_5SO_3^-$, $C_6H_5CO_2^-$ and $CH_3C_6H_4SO_3$.

24. A battery according to claim 21, wherein the dopant is a cation selected from the group consisting of an alkali metal ion and an organic cation which is selected from the group consisting of $R_{4-x}MH_x^+$ and $R_3E^+$, wherein R is alkyl or aryl, M is N, P or AS, E is O or S, and X is an integer ranging from 0 to 4.

25. A battery according to claim 21, wherein the dopant is $HF_2^-$.

26. A battery according to claim 21, wherein the dopant is a cation selected from the group consisting of pyrylium and pyridinium cations represented by the following formula (I):

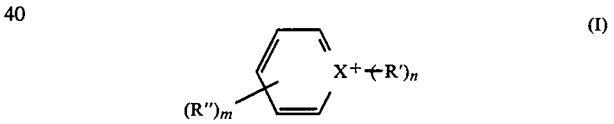

wherein X stands for an oxygen atom or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, n is zero when X is an oxygen atom or n is 1 when X is a nitrogen atom, and m is an integer of from 0 to 5; and carbonium cations represented by the following formulae (II) and (III):

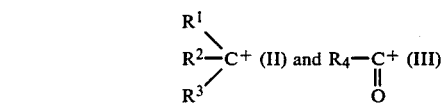

wherein $R^1$, $R^2$ and $R^3$ stand for a hydrogen atom, an alkyl group having 1 to 15 carbon atoms, an allyl group, an aryl group having 6 to 20 carbon atoms or a group $-OR^5$, in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

27. A battery according to claim 21, wherein both the positive and negative electrodes are made of the reinforced acetylene high polymer shaped article.

28. A battery according to claim 21, wherein the positive electrode is made of the reinforced acetylene high polymer shaped article and the negative electrode is made of another electrically conductive high polymer.

29. A battery according to claim 1 wherein the dopant is an anion selected from the group consisting of an anion of a halide of an element of the group VA of the Periodic Table, an anion of a halide of an element of the group IIIA of the Periodic Table, a halogen anion, a perhalo-acid anion and an organic anion.

30. A battery according to claim 1 wherein the dopant is an anion selected from the group consisting of $PF_6^-$, $SbF_6^-$, $AsF_6^-$, $SbCl_6^-$, $SiF_6^{--}$, $BF_4^-$, $BCl_4^-$, $AlCl_4^-$, $I^-$ or $I_3^-$, $Br^-$, $Cl^-$, $NO_3^-$, $POF_4^-$, $CN^-$, $ClO_4^-$, $IO_4^-$, $CF_3SO_3^-$, $CH_3CO_2^-$, $CF_3CO_2^-$ $C_6H_5SO_3^-$, $C_6H_5CO_2^-$, and $CH_3C_6H_4SO_3$.

31. A battery according to claim 1 wherein the dopant is a cation selected from the group consisting of an alkali metal ion and an organic cation which is selected from the group consisting of $R_{4-x}MH_x^+$ and $R_3E^+$, wherein R is alkyl or aryl, M is N, P or AS, E is O or S, and X is an integer ranging from 0 to 4.

32. A battery according to claim 1, wherein the dopant is $HF_2^-$.

33. A battery according to claim 1 wherein the dopant is a cation selected from the group consisting of pyrylium and pyridinium cations represented by the following formula (I):

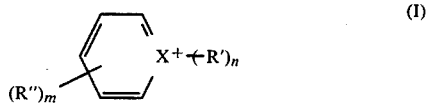

wherein X stands for an oxygen atom or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, n is zero when X is an oxygen atom or n is 1 when X is a nitrogen atom, and m is an integer of from 0 to 5; and carbonium cations represented by the following formulae (II) and (III):

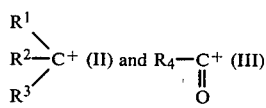

wherein $R^1$, $R^2$ and $R^3$ stand for a hydrogen atom, an alkyl group having 1 to 15 carbon atoms, an allyl group, an aryl group having 6 to 20 carbon atoms or a group $-OR^5$, in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

34. A battery according to claim 1, wherein the amount of the dopant is in the range of 2 to 40 moles per mole of the recurring unit —CH— in the acetylene high polymer.

35. A battery according to claim 1, wherein the reinforced acetylene high polymer shaped article further comprises 1 to 5 parts by weight of an electrically conductive material.

36. A battery according to claim 35, wherein at least one of the positive and negative electrodes is made of the reinforced acetylene high polymer shaped article.

37. A battery according to claim 36, which is a primary battery.

38. A battery according to claim 36, which is a secondary battery.

39. A battery according to claim 38, wherein both the positive and negative electrodes are made of the reinforced acetylene high polymer shaped article.

40. A battery according to claim 38, wherein the positive electrode is made of the reinforced acetylene high polymer shaped article and the negative electrode is made of another electrically conductive high polymer.

41. A battery according to claim 35, wherein the sheet-form product of a fibrous material is a net or screen having a 10 to 400 mesh size according to the Tyler standard sieve.

42. A battery according to claim 35, wherein the sheet-form product of a fibrous material is a net or screen having a porosity of 30 to 90%.

43. A battery according to claim 35, wherein the electrically conductive material is carbon black, acetylene black or carbon fiber.

44. A battery according to claim 35, wherein said reinforced acetylene high polymer shaped article is prepared by blending the acetylene high polymer with the electrically conductive material in the presence of an organic solvent.

45. A battery according to claim 35, wherein said reinforced acetylene high polymer shaped article is prepared by blending the acetylene high polymer with the electrically conductive material in the absence of an organic solvent.

46. A battery according to claim 1 wherein the amount of said organic solvent comprises up to 500 parts by weight per 100 parts by weight of said acetylene high polymer.

47. A battery according to claim 1, wherein said pressing or calendering is effected at a pressure of at least 10 kg/cm$^2$ and at a temperature not in excess of 200° C.

48. A battery according to claim 1, wherein the sheet-form product has an electrical conductivity of at least $1 \times 10^{-3} \Omega^{-1} \cdot cm^{-1}$.

49. A battery according to claim 1, wherein the sheet-form product has an electrical conductivity of not more than $1 \times 10^{-3} \Omega^{-1} \cdot cm^{-1}$.

50. A battery according to claim 1 wherein the amount of said organic solvent is up to 500 parts by weight per 100 parts by weight of said acetylene high polymer.

51. A battery according to claim 1 wherein said shaping of the swollen or gel-like acetylene high polymer is effected at a pressure of at least 10 kg/cm$^2$ and at a temperature not in excess of 200° C.

52. A battery according to claim 1 wherein said acetylene high polymer is a short fiber having a length smaller than 5 cm.

53. A battery according to claim 1 wherein said acetylene high polymer shaped article is prepared by polymerizing acetylene in the presence of the sheet-form product of a fibrous material which has been coated or impregnated with a catalyst solution or dispersion whereby the resulting acetylene high polymer is deposited on the sheet-form product of the fibrous material at the polymerization step, and then, pressing or calendarizing the combination of the acetylene high polymer with the sheet-form product of the fibrous material.

54. A battery according to claim 53 wherein acetylene is polymerized in the presence of the sheet-form product of the fibrous material impregnated with a catalyst solution in an organic solvent to obtain an acetylene high polymer deposited on the sheet-form product, and then, the resulting combination of the acetylene high polymer with the sheet-form product is pressed or calendered in the state where the organic solvent is still contained in the sheet-form product.

55. A battery according to claim 1 wherein said swollen or gel-like acetylene high polymer containing an organic solvent is superposed upon the sheet-form product of the fibrous material, and then, the superposed assembly is pressed and calendered.

56. A battery according to claim 1 wherein a powdery or short fibrous swollen or gel-like acetylene high polymer containing an organic solvent is superposed upon the sheet-form product of the fibrous material, and then, the superposed assembly is pressed or calendered.

57. A battery according to claim 56 wherein the organic solvent-containing powdery or short fibrous acetylene high polymer is prepared by pulverizing an acetylene high polymer which has been swollen or gel-like with the organic solvent.

* * * * *